US009625951B2

(12) United States Patent
Liang et al.

(10) Patent No.: US 9,625,951 B2
(45) Date of Patent: Apr. 18, 2017

(54) SUPPORTING BASE AND COMPUTER SYSTEM

(71) Applicant: Wistron Corporation, New Taipei (TW)

(72) Inventors: Chen-Yi Liang, New Taipei (TW); Hung-Chih Chen, New Taipei (TW); Chun-Chien Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/842,839

(22) Filed: Sep. 2, 2015

(65) Prior Publication Data

US 2016/0349801 A1 Dec. 1, 2016

(30) Foreign Application Priority Data

May 25, 2015 (TW) .............................. 104116638 A

(51) Int. Cl.
*G06F 1/16* (2006.01)
(52) U.S. Cl.
CPC ............ *G06F 1/1662* (2013.01); *G06F 1/169* (2013.01); *G06F 1/1616* (2013.01)
(58) Field of Classification Search
CPC combination set(s) only.
See application file for complete search history.

(56) References Cited

U.S. PATENT DOCUMENTS

| 5,175,672 | A * | 12/1992 | Conner | G06F 1/1616 235/145 R |
| 6,842,332 | B1 * | 1/2005 | Rubenson | G06F 1/1616 361/679.09 |
| 6,922,333 | B2 * | 7/2005 | Weng | G06F 1/1616 220/230 |
| 6,937,468 | B2 * | 8/2005 | Lin | G06F 1/1632 361/679.41 |
| 8,238,085 | B2 * | 8/2012 | Wu | G06F 1/1616 312/223.1 |
| 8,390,413 | B2 * | 3/2013 | Lauder | G06F 1/1613 206/320 |

(Continued)

FOREIGN PATENT DOCUMENTS

TW 201407315 2/2014
TW 201415195 4/2014

(Continued)

OTHER PUBLICATIONS

"Office Action of Taiwan Counterpart Application" with partial English translation, issued on Feb. 23, 2016, p. 1-p. 20.

*Primary Examiner* — Lisa Lea Edmonds
(74) *Attorney, Agent, or Firm* — Jianq Chyun IP Office

(57) ABSTRACT

A supporting base suitable for a computer device is provided. The computer device has a device fitting portion. The supporting base includes a main body and a connection interface. The connection interface includes a housing and a first moving element. The housing is connected to the main body and has an opening. The first moving element is movably disposed in the housing and has a base fitting portion. The base fitting portion protrudes out from the housing through the opening to be engaged with the device fitting portion of the computer device. A computer system having said supporting base and said computer device is also provided herein.

28 Claims, 8 Drawing Sheets

(56) References Cited

U.S. PATENT DOCUMENTS

| | | | | |
|---|---|---|---|---|
| 8,599,542 B1* | 12/2013 | Healey | G06F 1/1626 | 345/168 |
| 8,634,196 B2* | 1/2014 | Liu | G06F 1/1624 | 16/363 |
| 8,693,191 B2* | 4/2014 | Xu | G06F 1/1616 | 361/679.55 |
| 8,817,457 B1* | 8/2014 | Colby | G06F 1/1669 | 206/320 |
| 9,025,321 B2* | 5/2015 | Liang | G06F 1/1669 | 361/679.01 |
| 9,072,174 B2* | 6/2015 | Lin | H05K 7/02 | |
| 9,146,582 B2* | 9/2015 | Liang | G06F 1/1601 | |
| 9,146,586 B2* | 9/2015 | Ho | G06F 1/1616 | |
| 9,253,379 B2* | 2/2016 | Lam | G06F 1/1616 | |
| 9,304,546 B2* | 4/2016 | Huang | G06F 1/1632 | |
| 9,372,511 B2* | 6/2016 | Yeh | G06F 1/1669 | |
| 9,377,815 B2* | 6/2016 | Chen | G06F 1/1615 | |
| 2008/0297995 A1* | 12/2008 | Lai | G06F 1/1616 | 361/679.09 |
| 2010/0238620 A1* | 9/2010 | Fish | G06F 1/1616 | 361/679.09 |
| 2012/0068798 A1* | 3/2012 | Lauder | G06F 1/1613 | 335/306 |
| 2012/0194448 A1* | 8/2012 | Rothkopf | A45C 13/002 | 345/173 |
| 2013/0170126 A1* | 7/2013 | Lee | G06F 1/1654 | 361/679.17 |
| 2013/0279096 A1* | 10/2013 | Gengler | H05K 7/00 | 361/679.01 |
| 2014/0071605 A1* | 3/2014 | Bates | G06F 1/1662 | 361/679.09 |
| 2014/0133080 A1* | 5/2014 | Hwang | G06F 1/1632 | 361/679.17 |
| 2014/0211409 A1* | 7/2014 | Wolff | G06F 1/1679 | 361/679.43 |
| 2014/0240923 A1 | 8/2014 | Lin | | |
| 2015/0138721 A1* | 5/2015 | Liang | G06F 1/1632 | 361/679.44 |
| 2015/0146369 A1* | 5/2015 | Chen | G06F 1/1613 | 361/679.55 |
| 2015/0146371 A1* | 5/2015 | Liang | G06F 1/1656 | 361/679.56 |

FOREIGN PATENT DOCUMENTS

| | | |
|---|---|---|
| TW | 201418950 | 5/2014 |
| TW | 201433908 | 9/2014 |

* cited by examiner

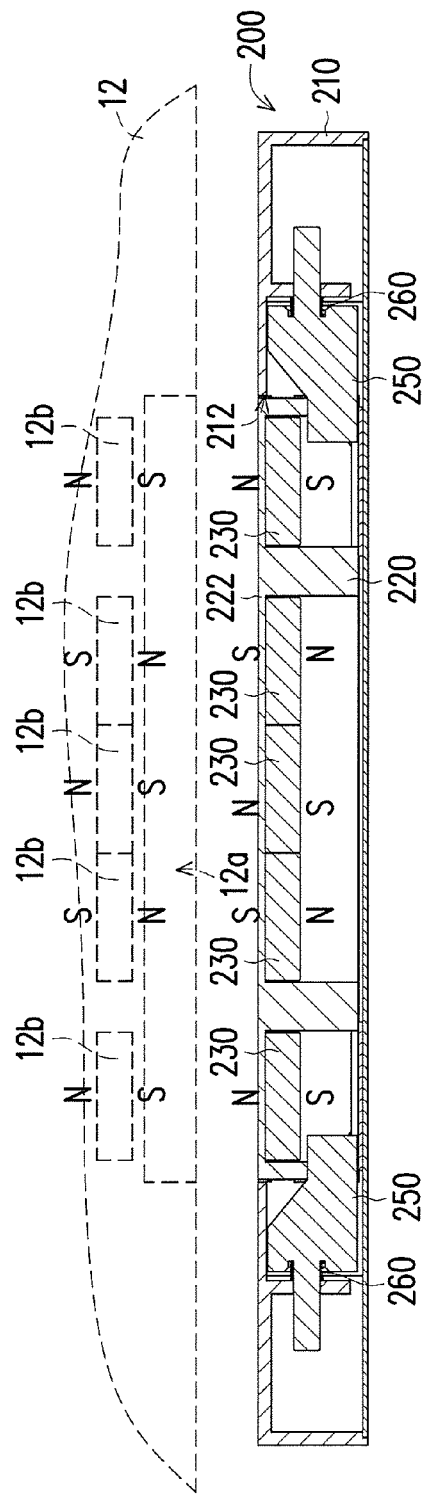
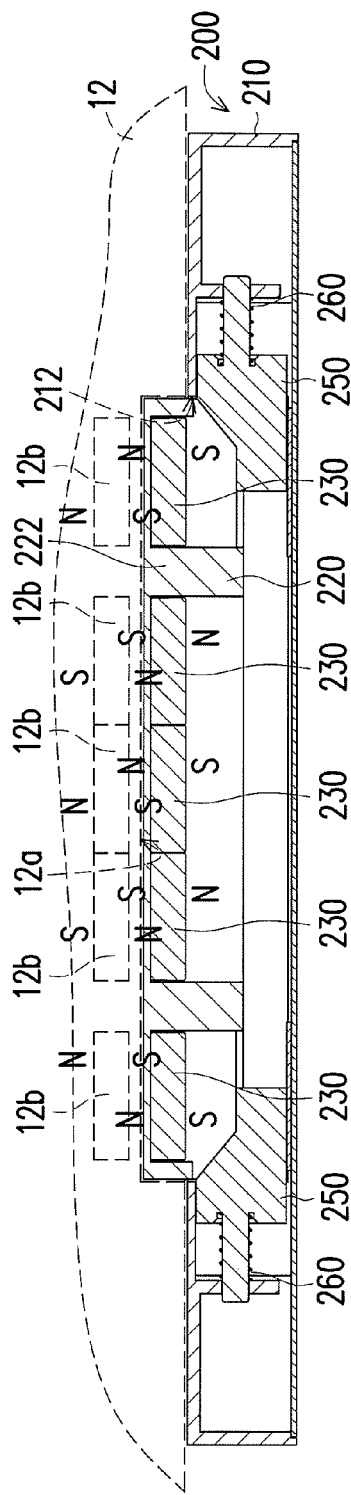
FIG. 7A
FIG. 7B

SUPPORTING BASE AND COMPUTER SYSTEM

CROSS-REFERENCE TO RELATED APPLICATION

This application claims the priority benefit of Taiwan application serial no. 104116638, filed on May 25, 2015. The entirety of the above-mentioned patent application is hereby incorporated by reference herein and made a part of this specification.

BACKGROUND OF THE INVENTION

1. Field of the Invention

The disclosure relates to a computer, and more particularly, to a supporting base used for connecting a computer device and a computer system including the supporting base and the computer device.

2. Description of Related Art

As compared to notebook computer, tablet computer does not have a physical keyboard in order to reduce weight and facilitate in portability; and as a result, the tablet computer has become very popular in consumer electronics products of current market. Touch screen of the tablet computer is able to provide a typing/input interface and is very convenient for performing works with a small amount of typing. However, under the condition of performing works with large amount of typing or requiring a physical keyboard, it can still be very laborious to carry out the large amount of typing through using the touch screen of the tablet computer. Therefore, when requiring to use a use mode of the traditional notebook computer, the tablet computer can be assembled to a corresponding keyboard base, and carry out the typing through the keyboard base. In addition, a position of the tablet computer relative to the keyboard base may further be adjusted through the keyboard base, so as to simulate a position adjustment of a display screen in relative to a system base of the traditional notebook computer. Nevertheless, such kind of keyboard base usually has a positioning piece or positioning pin that is exposed and protruding out of the keyboard base, and thereby affects the appearance of the keyboard base.

SUMMARY OF THE INVENTION

The disclosure is directed to a supporting base having a movable base fitting portion for being engaged with a device fitting portion of a computer device.

The disclosure is directed to a computer system with a supporting base having a movable base fitting portion for being engaged with a device fitting portion of a computer device thereof.

The disclosure provides a supporting base suitable for a computer device. The computer device has a device fitting portion. The supporting base includes a main body and a connection interface. The connection interface includes a housing, a first moving element and an interface magnetic element. The housing is connected to the main body and has an opening. The first moving element is movably disposed in the housing and has a base fitting portion. The base fitting portion protrudes out from the housing through the opening of the housing to be engaged with the device fitting portion of the computer device.

The disclosure provides a computer system having a computer device and a supporting base. The computer device has a device fitting portion. The supporting base includes a main body and a connection interface. The connection interface includes a housing, a first moving element and an interface magnetic element. The housing is connected to the main body and has an opening. The first moving element is movably disposed in the housing and has a base fitting portion. The base fitting portion protrudes out from the housing through the opening of the housing to be engaged with the device fitting portion of the computer device.

In view of the above, in the disclosure, the supporting base has the movable base fitting portion for being engaged with the device fitting portion of the computer device.

In order to make the aforementioned features and advantages of the present disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7A is a longitudinal cross-sectional view illustrating a computer system prior to assembly according to another embodiment of the disclosure.

FIG. 7B is a longitudinal cross-sectional view illustrating the computer system of FIG. 7A after the assembly.

DESCRIPTION OF THE EMBODIMENTS

Figure 1:
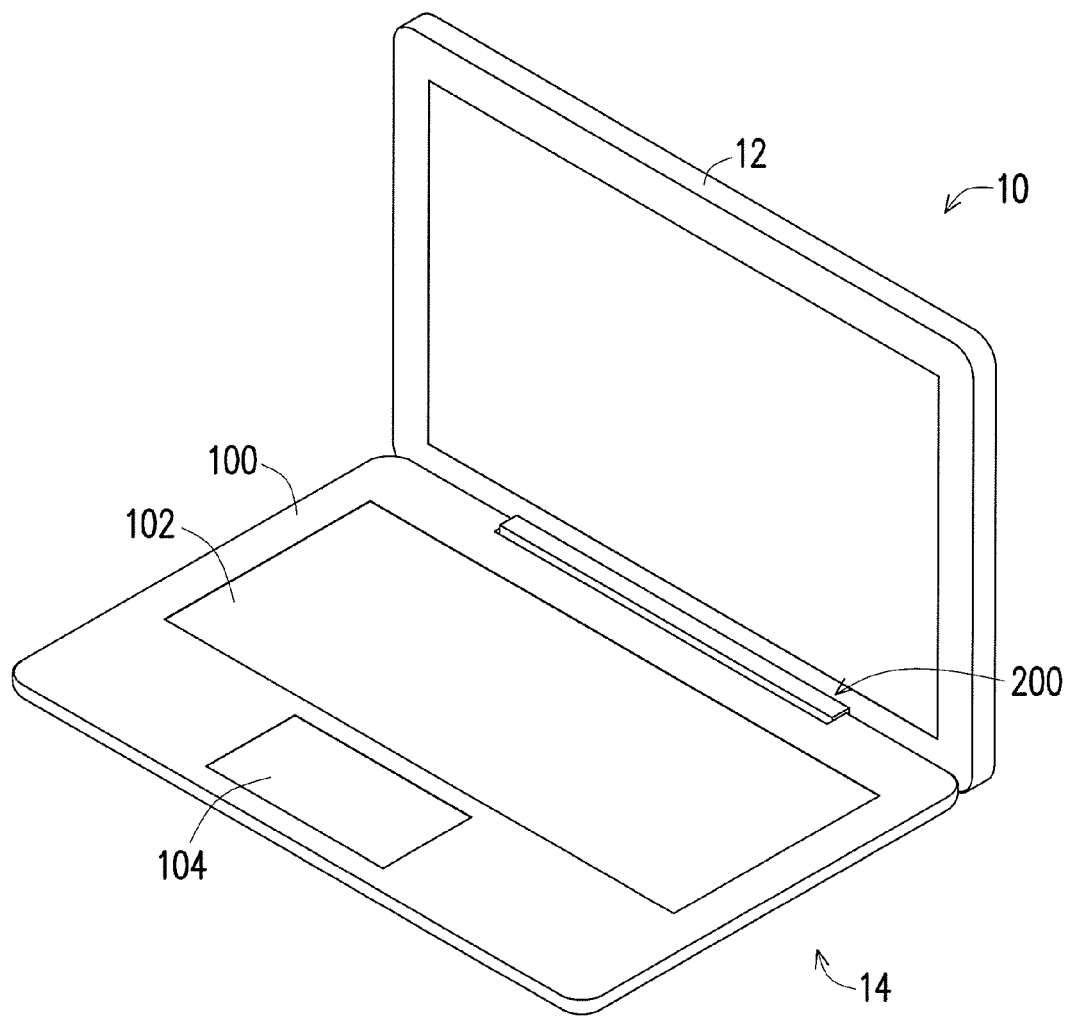
FIG. 1 is a perspective view illustrating a computer system according to an embodiment of the disclosure.

Referring to FIG. 1, in the present embodiment, a computer system 10 includes a computer device 12 and a supporting base 14. The computer device 12 is, for example, a tablet computer. The computer device 12 can be coupled to the supporting base 14 and rotates to a specific angle in relative to the supporting base 14. Specifically, referring to FIG. 2A and FIG. 2B, the supporting base 14 includes a main body 100 and a connection interface 200 connected to the main body 100, such that the computer device 12 is connected to the main body 100 through the connection interface 200. In the present embodiment, the connection interface 200 can be pivoted to the main body 100. As shown in FIG. 2B, the computer device 12 coupled to the connection interface 200 can rotate to an angle desired by a user in relative to the main body 100. In addition, the main body 100 may include a standard keyboard 102 and a touchpad 104, so that the supporting base 14 and the computer device 12 coupled to the supporting base 14 can simulate an expanded use mode of a traditional notebook computer. In order to provide functions, such as sound output, power supply and so forth, the main body 100 may also include components not shown in the drawing, such as a speaker, a battery and so forth.

Figure 2A:
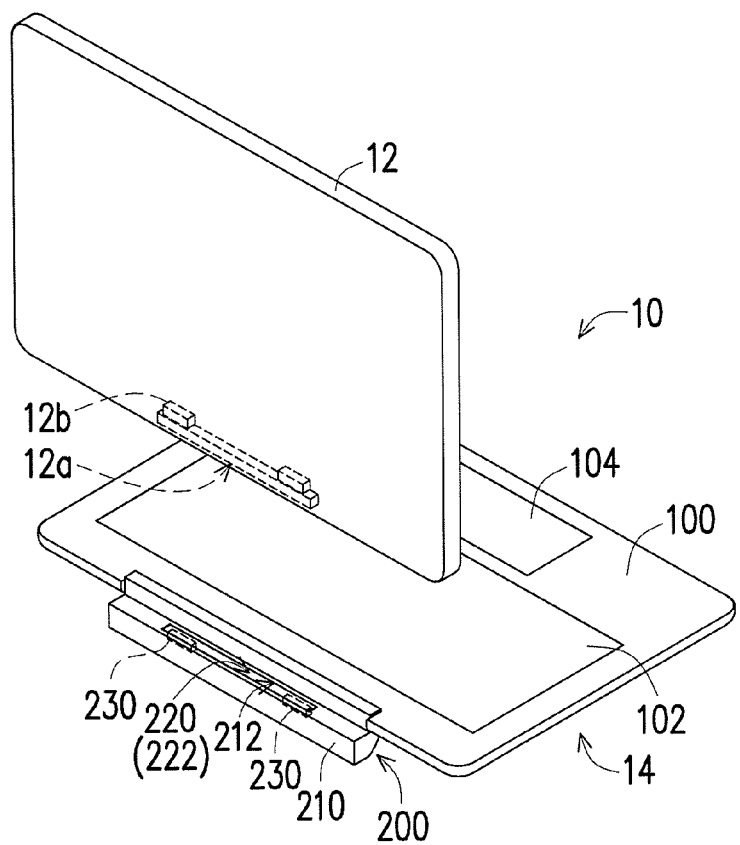
FIG. 2A is a perspective view illustrating the computer system of FIG. 1, prior to assembly, from another angle.
Figure 2B:
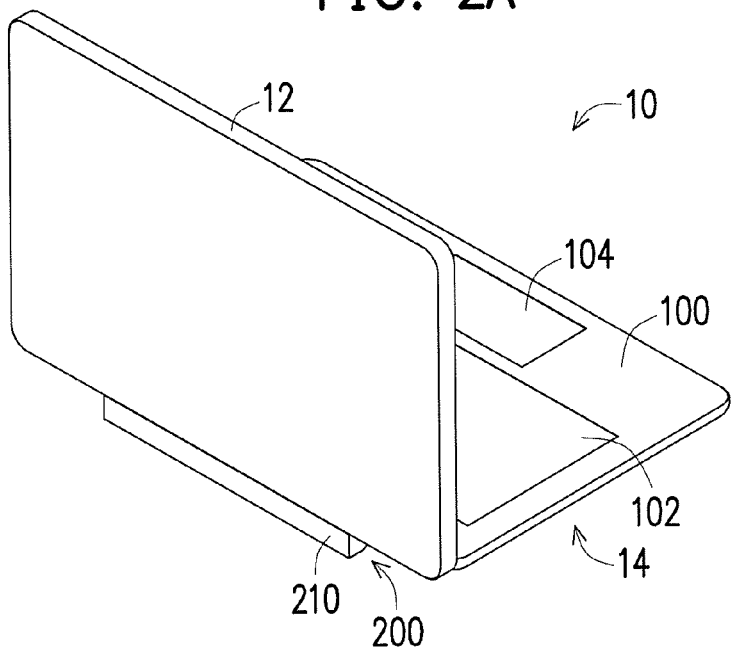
FIG. 2B is a perspective view illustrating the computer system of FIG. 1, after the assembly, from another angle.
Figure 3A:
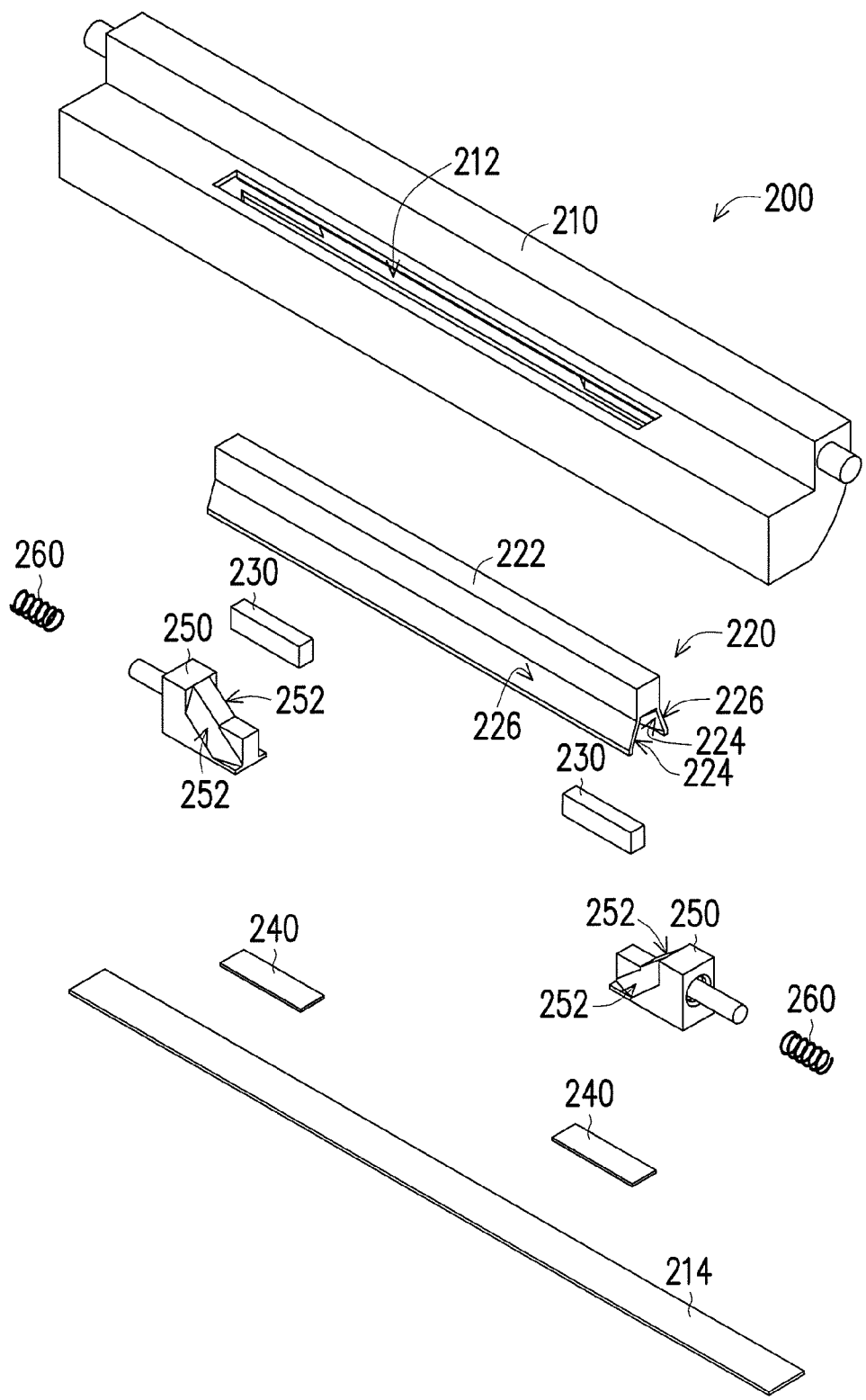
FIG. 3A is a top exploded view of a connection interface of a supporting base of FIG. 2A.
Figure 3B:
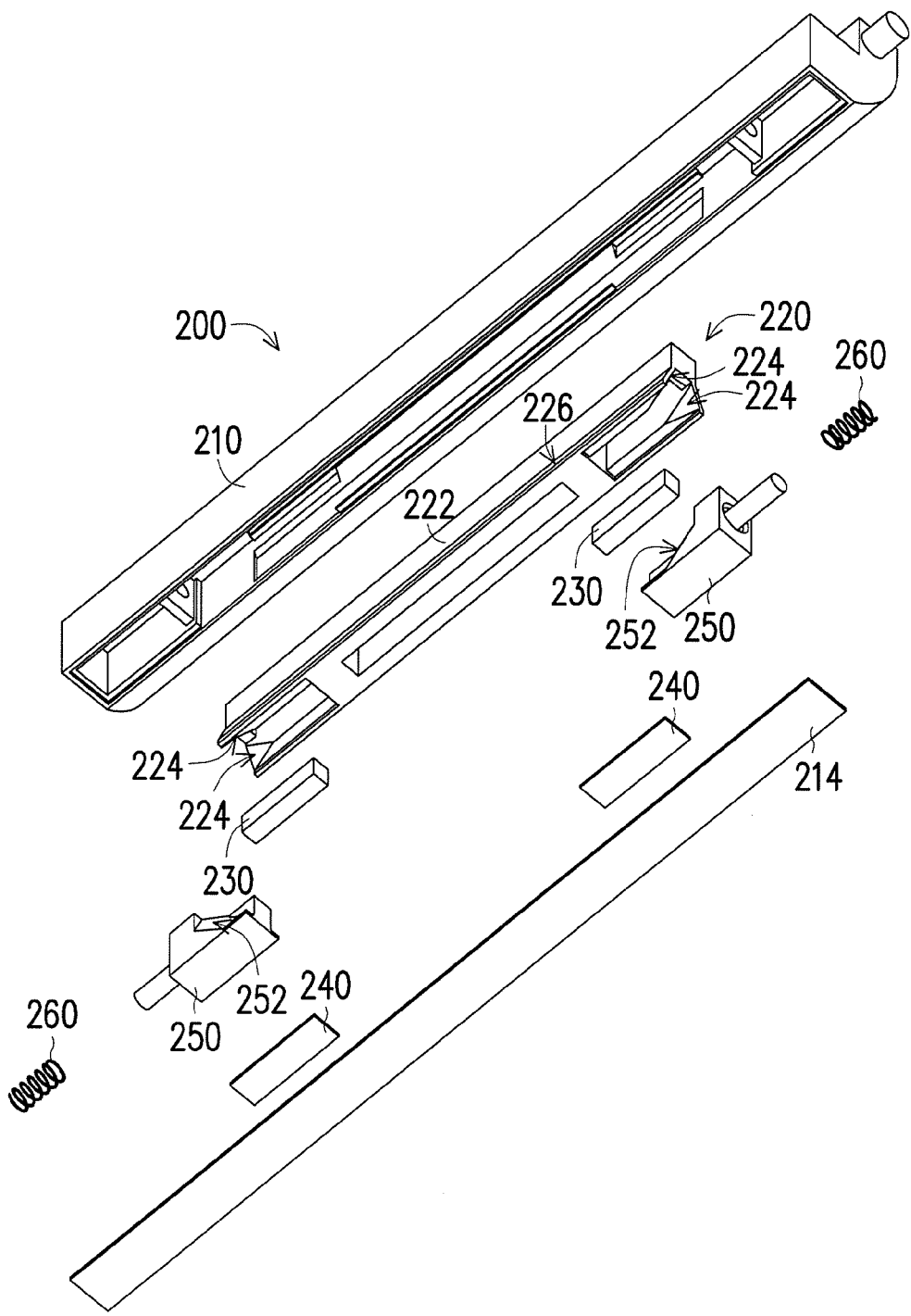
FIG. 3B is a top exploded view of the connection interface of the supporting base of FIG. 2A.

Referring to FIG. 2A, FIG. 3A and FIG. 3B, in order to structurally couple the computer device 12 to the connection interface 200 of the supporting base 14, the computer device 12 has a device fitting portion 12a, and the connection interface 200 includes a housing 210 and a first moving element 220. The housing 210 is connected to the main body 100 and has an opening 212. The first moving element 220 is movably disposed in the housing 210 and has a base fitting portion 222. The base fitting portion 222 can protrude out from the housing 210 through the opening 212 of the housing 210, so as to be engaged with the device fitting portion 12a of the computer device 12. In the present embodiment, the device fitting portion 12a and the base fitting portion 222 can respectively be a recessed portion and a protruding portion engaged with the recessed portion, but the disclosure is not limited thereto. In addition, the computer device 12 may further have a device magnetic element 12b, and the connection interface 200 may further include an interface magnetic element 230. The interface magnetic element 230 is fixed to the first moving element 220, and the interface magnetic element 230 and the device magnetic element 12b can mutually magnetic attract. Therefore, when the computer device 12 moves close to the first moving element 220, a magnetic attraction between the computer device 12 and the first moving element 220 is established by the device magnetic element 12b and the interface magnetic element 230. In the present embodiment, a side of the housing 210 can be opened, and after the abovementioned elements are installed into the housing 210, a decorative cover 214 can be used to cover the opened side of the housing 210 so as to resume the appearance of the housing 210.

Referring to FIG. 2A and FIG. 2B, during the process of assembly, the computer device 12 is moved close to the supporting base 14 until a bottom side of the computer device 12 is nearby the connection interface 200 of the supporting base 14. Now, a magnetic attraction between the interface magnetic element 230 and the device magnetic element 12b is also established. Hence, the magnetic attraction between interface magnetic element 23 and the device magnetic element 12b moves the first moving element 220 relative to the housing 210, so that the base fitting portion 222 protrudes out form the housing 210 through the opening 212 of the housing 210 to be engaged with the device fitting portion 12a of the computer device 12, as shown in FIG. 2B. More detailed descriptions are provided below with cross-sectional views.

Figure 4A:
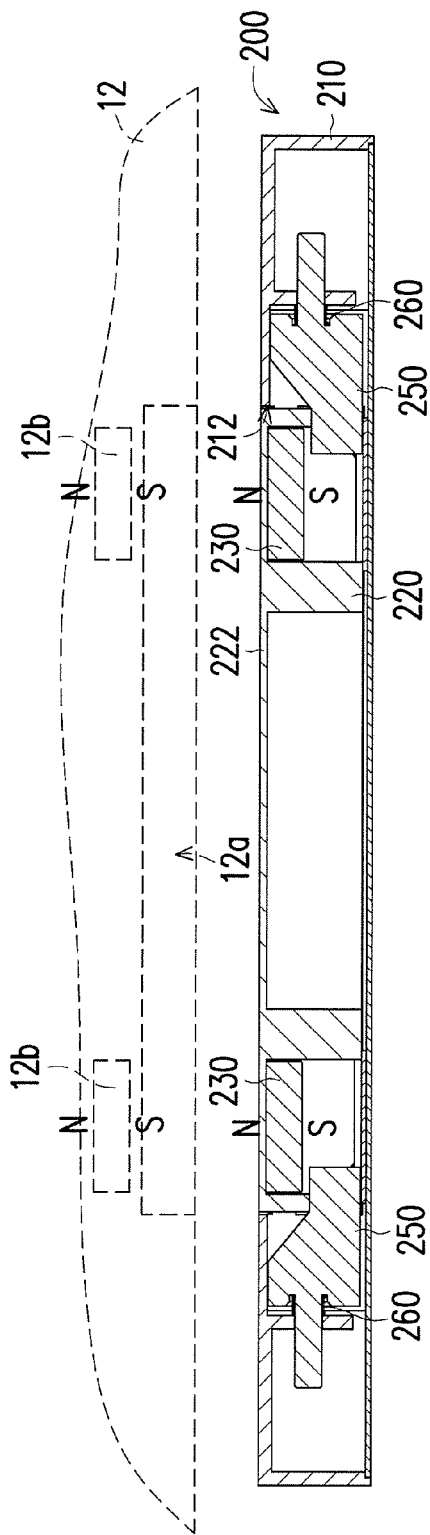
FIG. 4A is a longitudinal cross-sectional view illustrating the connection interface of FIG. 2A in an unused state.
Figure 4B:
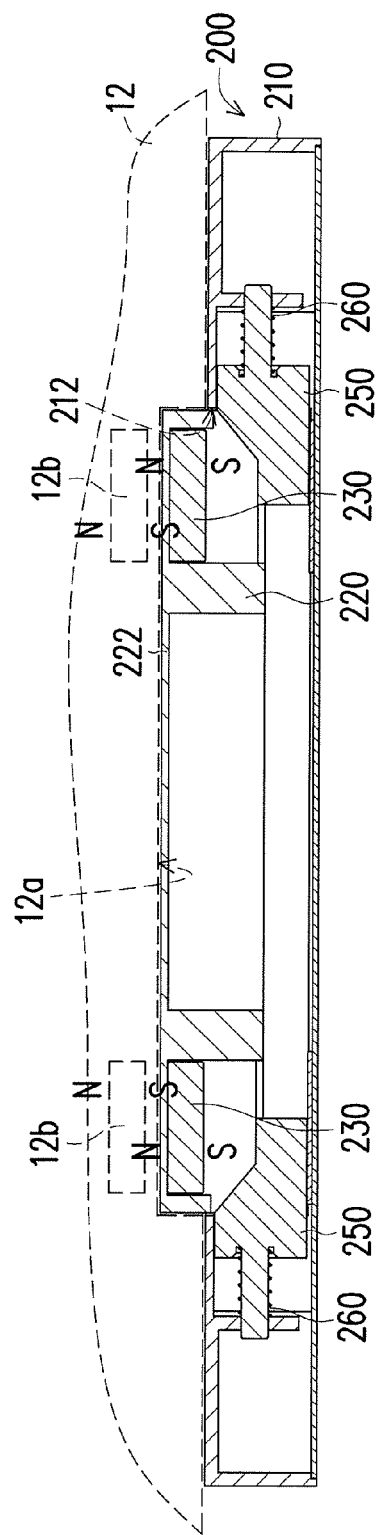
FIG. 4B is a longitudinal cross-sectional view illustrating the connection interface of FIG. 2A in a use state.

Referring to FIG. 4A and FIG. 4B, during the process of assembly, the computer device 12 is moved close to the supporting base 14 until the bottom side of the computer device 12 is nearby the connection interface 200. The magnetic attraction between the interface magnetic element 230 and the device magnetic element 12b moves the first moving element 220 relative to the housing 210, so that the base fitting portion 222 protrudes out from the housing 210 through the opening 212 of the housing 210 so as to be engaged with the device fitting portion 12a of the computer device 12. Therefore, when establishing the magnetic attraction between the computer device 14 and the first moving element 220, the computer device 12 is structurally coupled to the connection interface 200 of the supporting base 14, as shown in FIG. 4B. It is worthily noted that, in the present embodiment, only the structural coupling relationship between the computer device 12 and the supporting base 14 is being disclosed, whereby an electrical coupling relationship (such as, power supply or signal transmission) between the two can be achieved using physical signal transmission (e.g., terminal contact) or wireless signal transmission (e.g., Bluetooth transmission).

Referring to FIG. 3A, FIG. 3B and FIG. 4A, after the computer device 12 moves away from the connection interface 200 of the supporting base 14, the base fitting portion 222 is no longer engaged with the device fitting portion 12a. In order to return the base fitting portion 222 into the housing 210, the connection interface 200 further includes a housing magnetic element 240, which is fixed to the housing 210. When the computer device 12 moves away from the connection interface 200 of the supporting base 14 and thereby releases the magnetic attraction between the interface magnetic element 230 and the device magnetic element 12b, the magnetic attraction between the interface magnetic element 230 and the housing magnetic element 240 constitutes a reset bias to move the first moving element 220 relative to the housing 210, so that the base fitting portion 222 returns back into the housing 210 through the opening 212 of the housing 210. In the present embodiment, in order to ensure that the opening 212 of the housing 210 does not affect the appearance of the housing 210, the base fitting portion 222, which is returned back into the housing 210, seals the opening 212 and is flush with the opening 212. Moreover, in the present embodiment, the device magnetic element 12b and the interface magnetic element 230 are magnetizing elements (e.g., magnets), and the housing magnetic element 240 is a magnetized element (e.g., a metal piece, which is capable of being induced by a magnetic field of a magnet and mutually attracts with the magnet).

Referring to FIG. 3A, FIG. 3B, FIG. 4A and FIG. 5, in the present embodiment, in order to prevent the first moving element 220 from swaying relative to the housing 210, the connection interface 200 further includes a pair of second moving elements 250 and a pair of biasing elements 260. The pair of second moving elements 250 is movably disposed in the housing 210, and the pair of biasing elements 260 is respectively disposed between the housing 210 and the pair of second moving elements 250. The first moving element 220 further has two pairs of first skew planes 224, and each pair of second moving elements 250 has a pair of second skew planes 252. In the present embodiment, each of the biasing elements 260 may be an elastic element (e.g., a coil spring), and each of the biasing elements 260 is disposed between the housing 210 and corresponding second moving element 250.

Figure 5:
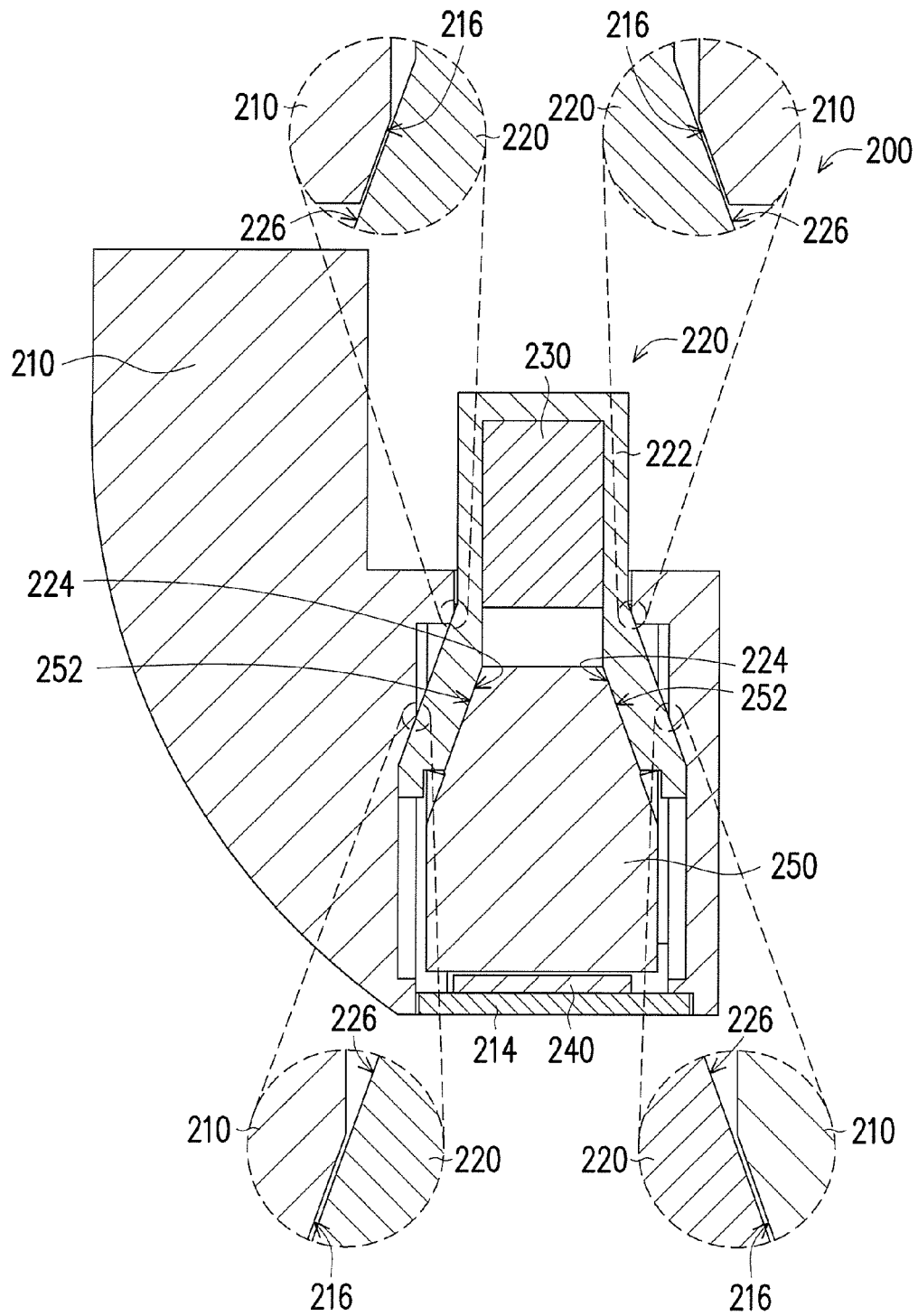
FIG. 5 is a transverse cross-sectional view illustrating the connection interface of FIG. 2A in a use state.

Referring to FIG. 4B and FIG. 5, when the base fitting portion 222 of the first moving element 220 moves out from the housing 210 through the opening 212 of the housing 210 to be engaged with the device fitting portion 12a of the computer device 12, the pair of biasing elements 260 (namely, the elastic elements) generate an elastic repulsion to constitute an abutting bias to move the pair of second moving elements 250 relative to the housing 210, so as to ensure that the pair of first skew planes 224 is respectively abutted against the corresponding pair of second skew planes 252, and thereby prevent the first moving element 220 from swaying relative to the housing 210. In the present embodiment, when each pair of first skew planes 224 is respectively abutted against the corresponding pair of second skew planes 252, the first moving element 220 and the housing 210 are also abutted against each other. Specifically, as shown in FIG. 5, the housing 210 has a plurality pairs of housing abutting surfaces 216, and the first moving element 220 has a pair of first abutting surfaces 226. When each pair of first skew planes 224 is respectively abutted against the corresponding pair of second skew planes 252, the pair of first abutting surfaces 226 is respectively abutted against the corresponding pairs of housing abutting surfaces 216, so that the first moving element 220 does not sway relative to the housing 210.

In the above embodiment, a pair of second moving elements 250 and a pair of biasing elements 260 are adopted in pairs to prevent the first moving element 220 from swaying relative to the housing 210. However, in another embodiment (not shown), a single second moving element 250 and a single biasing element 260 may also be used at one end of the first moving element 220, while the other end of the first moving element 220 may be changed to use other sway preventing mechanism, so as to achieve the same effect.

Figure 6A:
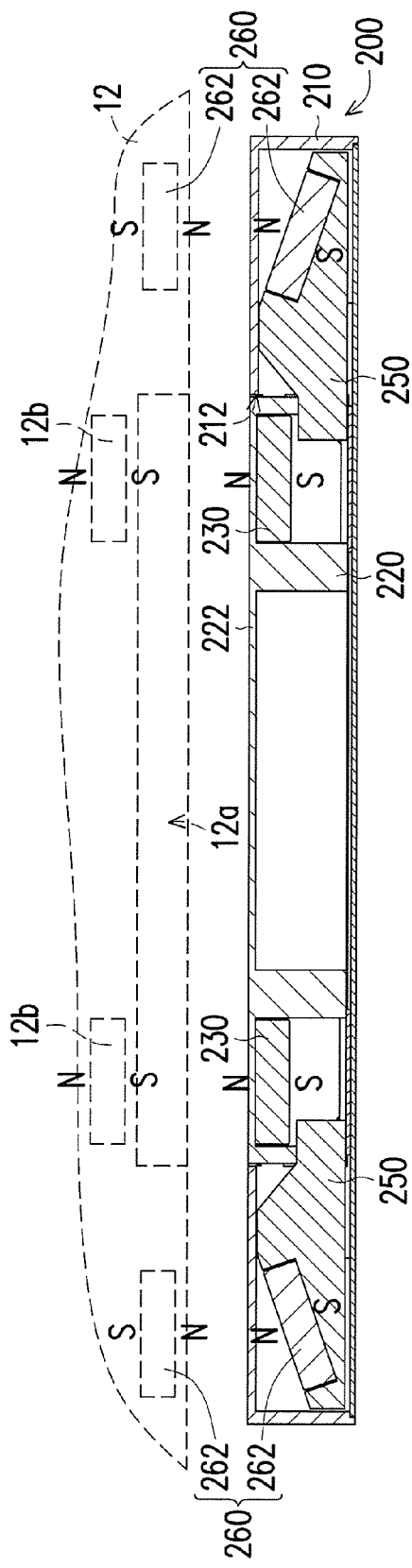
FIG. 6A is a longitudinal cross-sectional view illustrating a connection interface of a supporting base of a computer system in an unused state according to another embodiment of the disclosure.
Figure 6B:
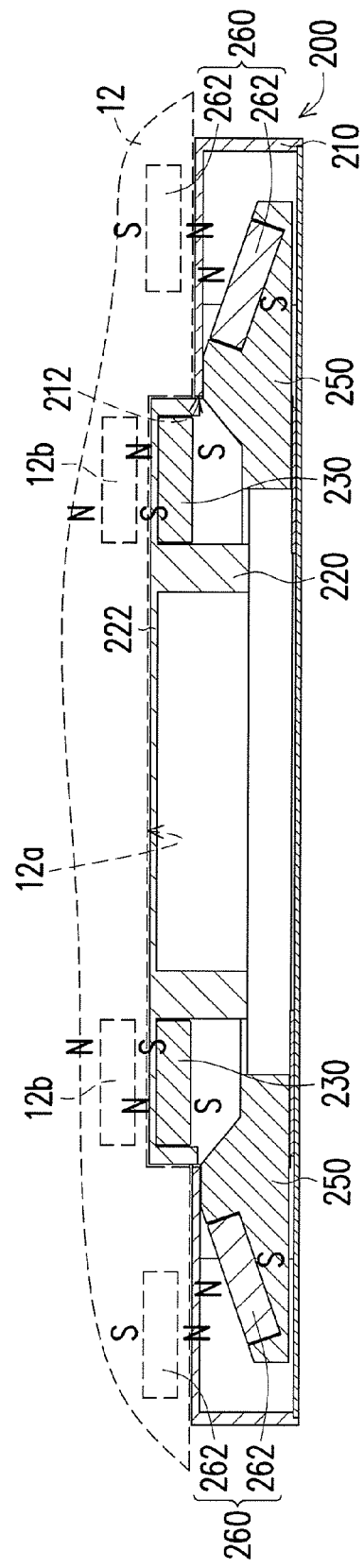
FIG. 6B is a longitudinal cross-sectional view illustrating the connection interface of FIG. 6A in a use state.

Referring to FIG. 6A and FIG. 6B, as compared to the embodiment shown in FIG. 4A and FIG. 4B, in the present embodiment, each of the biasing elements 260 includes a pair of magnetizing elements 262 (e.g., magnets), which are respectively fixed at the computer device 12 and the corresponding second moving element 250. Hence, when the computer device 12 moves close to the connection interface 200 of the supporting base 14, the magnetic attraction between the interface magnetic element 230 and the device magnetic element 12b moves the first moving element 220 relative to the housing 210, so that the base fitting portion 222 protrudes out form the housing 210 through the opening 212 of the housing 210 to be engaged with the device fitting portion 12a of the computer device 12. Concurrently, a magnetic repulsion between each pair of magnetizing elements 262 constitutes an abutting bias to move the second moving element 250 relative to the housing 210, so as to ensure that each pair of first skew planes 224 is respectively abutted against the corresponding pair of second skew planes 252, and thereby prevents the first moving element 220 from swaying relative to the housing 210.

Referring to FIG. 7A and FIG. 7B, as compared to the embodiment shown in FIG. 4A and FIG. 4B, in the present embodiment, a plurality of device magnetic elements 12b and a plurality of interface magnetic elements 230 are adopted, the interface magnetic elements 230 magnetically attract the device magnetic elements 12b, respectively, and polarities of two adjacent interface magnetic elements 230 are different, so that one of the device magnetic elements 12b magnetically attracts the corresponding device magnetic element 12b while being mutually magnetically repulsive with another device magnetic element 12b adjacent to the corresponding device magnetic element 12b. Therefore, when the computer device 12 moves close to the connection interface 200 of the supporting base 14, the interface magnetic elements 230 and the device magnetic elements 12b are arranged into special arrangements by simultaneously using the magnetic attraction and the magnetic repulsion, and thereby improve an accuracy of alignment.

In summary, in the disclosure, the supporting base has the movable base fitting portion for being engaged with the device fitting portion of the computer device. The base fitting portion can return back into the housing and be flush with the opening of the housing, so as to maintain the appearance of the housing. The biasing element can ensure the contacts between the skew planes of the first moving element and the second moving element, so as to prevent the first moving element from swaying relative to the housing. The interface magnetic elements and the device magnetic elements are arranged into special arrangements by simultaneously using the magnetic attraction and the magnetic repulsion, and thereby improve the accuracy of alignment.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A supporting base suitable for a computer device, the computer device having a device fitting portion, the supporting base comprising:
   a main body; and
   a connection interface, comprising:
      a housing, connected to the main body and having an opening;
      a first moving element, movably disposed in the housing and having a base fitting portion and has at least a pair of first skew planes, wherein the base fitting portion protrudes out from the housing through the opening of the housing to be engaged with the device fitting portion of the computer device; and
      at least a second moving element, movably disposed in the housing and having a pair of second skew planes, wherein the pair of first skew planes is adapted to be respectively abutted against the pair of second skew planes.

2. The supporting base as recited in claim 1, wherein the housing is pivoted to the main body.

3. The supporting base as recited in claim 1, wherein the main body has a standard keyboard and a touchpad.

4. The supporting base as recited in claim 1, wherein the computer device further has a device magnetic element, and the connection interface further comprises:
   an interface magnetic element, fixed to the first moving element, wherein a magnetic attraction between the interface magnetic element and the device magnetic element moves the first moving element relative to the housing, so that the base fitting portion protrudes out from the housing through the opening of the housing to be engaged with the device fitting portion of the computer device.

5. The supporting base as recited in claim 4, wherein the connection interface further comprises:
   a housing magnetic element, fixed to the housing, wherein when the magnetic attraction between the interface magnetic element and the device magnetic element is released, a magnetic attraction between the interface magnetic element and the housing magnetic element moves the first moving element relative to the housing, so that the base fitting portion returns back into the housing through the opening of the housing.

6. The supporting base as recited in claim 5, wherein the device magnetic element and the interface magnetic element are magnetizing elements, and the housing magnetic element is a magnetized element.

7. The supporting base as recited in claim 4, wherein the number of the device magnetic element is a plurality, the number of the interface magnetic element is a plurality, the interface magnetic elements magnetically attract the device magnetic elements, respectively, and polarities of two adjacent interface magnetic elements are different, so that one of the device magnetic elements magnetically attracts the corresponding device magnetic element while being mutually magnetically repulsive with another device magnetic element adjacent to the corresponding device magnetic element.

8. The supporting base as recited in claim 1, wherein the base fitting portion returned back into the housing seals the opening and is flush with the opening.

9. The supporting base as recited in claim 1, wherein a number of the at least a pair of first skew planes is two pairs, a number of the at least a second moving element is a pair, and the connection interface further comprises:
   a pair of biasing elements, disposed between the housing and the pair of the second moving elements to move the pair of second moving elements relative to the housing, so as to ensure that each pair of the first skew planes is respectively abutted against the corresponding pair of second skew planes.

10. The supporting base as recited in claim 9, wherein each of the biasing elements is an elastic element, and the elastic element is disposed between the housing and the corresponding second moving element.

11. The supporting base as recited in claim 9, wherein each of the biasing elements comprises a pair of magnetizing elements, the pair of magnetizing elements is respectively fixed at the computer device and the corresponding second moving element, and a magnetic repulsion between each pair of magnetizing elements moves the corresponding second moving element relative to the housing, so as to ensure that each pair of first skew planes is respectively abutted against the corresponding pair of second skew planes.

12. The supporting base as recited in claim 1, wherein the connection interface further comprises:
   a biasing element, disposed between the housing and the second moving eat to move the second moving element relative to the housing, so as to ensure that the pair of first skew planes is respectively abutted against the pair of second skew planes.

13. The supporting base as recited in claim 12, wherein the biasing element is an elastic element, and the elastic element is disposed between the housing and the second moving element.

14. The supporting base as recited in claim 12, wherein the biasing element comprises a pair of magnetizing elements, the pair of magnetizing elements is respectively fixed at the computer device and the second moving element, and a magnetic repulsion between the pair of magnetizing elements moves the second moving element relative to the housing so as to ensure that the pair of first skew planes is respectively abutted against the pair of second skew planes.

15. A computer system, comprising:
   a computer device, having a device fitting portion; and
   a supporting base, comprising:
      a main body; and
      a connection interface, comprising:
         a housing, connected to the main body and having an opening;
         a first moving element, movably disposed in the housing and having a base fitting portion and has at least a pair of first skew planes, wherein the base fitting portion protrudes out from the housing through the opening of the housing to be engaged with the device fitting portion of the computer device; and
         at least a second moving element, movably disposed in the housing and having a pair of second skew planes, wherein the pair of first skew planes is adapted to be respectively abutted against the pair of second skew planes.

16. The computer system as recited in claim 15, wherein the housing is pivoted to the main body.

17. The computer system as recited in claim 15, wherein the main body has a standard keyboard and a touchpad.

18. The computer system as recited in claim 15, wherein the computer device further has a device magnetic element, and the connection interface further comprises:
   an interface magnetic element, fixed to the first moving element, wherein a magnetic attraction between the interface magnetic element and the device magnetic element moves the first moving element relative to the housing, so that the base fitting portion protrudes out from the housing form the opening of the housing to be engaged with the device fitting portion of the computer device.

19. The computer system as recited in claim 18, wherein the connection interface further comprises:
   a housing magnetic element, fixed to the housing, wherein when the magnetic attraction between the interface magnetic element and the device magnetic element is released, a magnetic attraction between the interface magnetic element and the housing magnetic element moves the first moving element relative to the housing, so that the base fitting portion returns back into the housing through the opening of the housing.

20. The computer system as recited in claim 19, wherein the device magnetic element and the interface magnetic element are magnetizing elements, and the housing magnetic element is a magnetized element.

21. The computer system as recited in claim 18, wherein the number of the device magnetic element is a plurality, the number of the interface magnetic element is a plurality, the interface magnetic elements magnetically attract the device magnetic elements, respectively, and polarities of two adjacent interface magnetic elements are different, so that one of the device magnetic elements magnetically attracts the corresponding device magnetic element while being mutually magnetically repulsive with another device magnetic element adjacent to the corresponding device magnetic element.

22. The computer system as recited in claim 15, wherein the base fitting portion returned back into the housing seals the opening and is flush with the opening.

23. The computer system as recited in claim 15, wherein a number of the at least a pair of first skew planes is two pairs, a number of the at least a second moving element is a pair, and the connection interface further comprises:
   a pair of biasing elements, disposed between the housing and the pair of the second moving elements to move the pair of second moving elements relative to the housing, so as to ensure that each pair of the first skew planes is respectively abutted against the corresponding pair of second skew planes.

24. The computer system as recited in claim 23, wherein each of the biasing elements is an elastic element, and the elastic element is disposed between the housing and the corresponding second moving element.

25. The computer system as recited in claim 23, wherein each of the biasing elements comprises a pair of magnetizing elements, the pair of magnetizing elements is respectively fixed at the computer device and the corresponding second moving element, and a magnetic repulsion between the each pair of magnetizing elements moves the corresponding second moving element relative to the housing, so as to ensure that each pair of first skew planes is respectively abutted against the corresponding pair of second skew planes.

26. The computer system as recited in claim 15, wherein the connection interface further comprises:
   a biasing element, disposed between the housing and the second moving element to move the second moving element relative to the housing, so as to ensure that the pair of first skew planes is respectively abutted against the pair of second skew planes.

27. The computer system as recited in claim 25, wherein the biasing element is an elastic element, and the elastic element is disposed between the housing and the second moving element.

28. The computer system as recited in claim 25, wherein the biasing element comprises a pair of magnetizing elements, the pair of magnetizing elements is respectively fixed at the computer device and the second moving element, and a magnetic repulsion between the pair of magnetizing elements moves the second moving element relative to the housing, so as to ensure that the pair of first skew planes is respectively abutted against the pair of second skew planes.

* * * * *